US009767301B2

(12) United States Patent
Jandhyala et al.

(10) Patent No.: US 9,767,301 B2
(45) Date of Patent: Sep. 19, 2017

(54) CONTEXT AWARE DATA PROTECTION

(75) Inventors: Srinivas Jandhyala, Hyderabad (IN); Albee Jhoney, Bangalore (IN); Sridhar R Muppidi, Austin, TX (US); Nataraj Nagaratnam, Durham, NC (US); Atul Saxena, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1306 days.

(21) Appl. No.: 13/413,636

(22) Filed: Mar. 6, 2012

(65) Prior Publication Data

US 2012/0185952 A1   Jul. 19, 2012

Related U.S. Application Data

(63) Continuation of application No. 12/789,184, filed on May 27, 2010, now abandoned.

(51) Int. Cl.
*G06F 21/00* (2013.01)
*G06F 21/62* (2013.01)

(52) U.S. Cl.
CPC .................. *G06F 21/6218* (2013.01)

(58) Field of Classification Search
CPC .................................................. G06F 21/6218

(Continued)

(56) References Cited

U.S. PATENT DOCUMENTS 5,841,869 A * 11/1998 Merkling .............. G06F 21/602
                                                        713/164
6,049,792 A *  4/2000 Hart ...................... G06F 9/4446
                                                         706/10

(Continued)

FOREIGN PATENT DOCUMENTS

| JP | 2007293866 A | 11/2007 |
| JP | 2008282182 A | 11/2008 |
| JP | 2009521750 A | 6/2009 |

OTHER PUBLICATIONS

Duma-et al.; "Privacy in the Semantic Web: What Policy Languages Have to Offer"; INSPEC/IEEE; 2007.

(Continued)

*Primary Examiner* — David García Cervetti
(74) *Attorney, Agent, or Firm* — Garg Law Firm, PLLC; Rakesh Garg; Scott S. Dobson

(57) ABSTRACT

A method, system, and computer usable program product for context aware data protection are provided. Information about an access context is received in a data processing system. A resource affected by the access context is identified. The identification of the resource may include deriving knowledge about resource by making an inference from a portion of contents of the resource that the access context affects the resource, making an inference that the access context affects a second resource thereby inferring that the resource has to be modified, determining that the access context is relevant to the resource, or a combination thereof. The resource is received. A policy that is applicable to the access context is identified. A part of the resource to modify according to the policy is determined. The part is modified according to the policy and the access context to form a modified resource. The modified resource is transmitted.

28 Claims, 8 Drawing Sheets

(58) Field of Classification Search
USPC .................................................. 726/27, 1
See application file for complete search history.

(56) References Cited

U.S. PATENT DOCUMENTS

| | | | | |
|---|---|---|---|---|
| 6,243,088 | B1* | 6/2001 | McCormack | G06F 3/04895 715/764 |
| 6,295,525 | B1* | 9/2001 | Hart | G06F 9/4446 706/45 |
| 6,487,552 | B1* | 11/2002 | Lei | G06F 17/30528 |
| 6,633,861 | B2* | 10/2003 | Hart | G06F 9/4446 706/47 |
| 7,072,956 | B2* | 7/2006 | Parupudi | G06F 21/62 709/220 |
| 7,104,445 | B2 | 9/2006 | Little et al. | |
| 7,152,244 | B2 | 12/2006 | Toomey | |
| 7,260,724 | B1 | 8/2007 | Dickinson et al. | |
| 7,290,181 | B2* | 10/2007 | D'Angelo | G06F 11/0775 714/48 |
| 7,434,257 | B2* | 10/2008 | Garg | G06F 9/4428 707/999.009 |
| 7,467,289 | B1* | 12/2008 | Garlick | G06F 9/485 712/228 |
| 7,562,072 | B2* | 7/2009 | Hennum | G06F 9/4446 |
| 7,610,297 | B2* | 10/2009 | Kamppari | G06F 9/4448 |
| 7,617,498 | B1* | 11/2009 | Lumsden | G06F 9/52 707/999.1 |
| 7,634,737 | B2* | 12/2009 | Beringer | G06F 17/30389 705/7.11 |
| 7,734,563 | B2* | 6/2010 | Hart | G06F 9/4446 706/45 |
| 7,805,746 | B2* | 9/2010 | Brandyberry | H04N 7/17309 725/110 |
| 7,818,353 | B2* | 10/2010 | Fusari | G06F 19/321 707/609 |
| 8,032,890 | B2* | 10/2011 | Brendle | G06F 9/485 709/225 |
| 8,170,560 | B2* | 5/2012 | Wu | H04W 36/0011 455/436 |
| 8,171,298 | B2* | 5/2012 | Ramaswamy | G06F 21/31 713/182 |
| 2002/0124067 | A1* | 9/2002 | Parupudi | G06F 21/62 709/223 |
| 2003/0140088 | A1* | 7/2003 | Robinson | G06Q 10/10 709/202 |
| 2003/0236781 | A1* | 12/2003 | Lei | G06F 17/30471 |
| 2004/0253963 | A1* | 12/2004 | Park | H04M 3/436 455/456.2 |
| 2004/0261032 | A1* | 12/2004 | Olander | G06F 3/0482 715/747 |
| 2005/0005243 | A1* | 1/2005 | Olander | G06F 3/0482 715/747 |
| 2005/0028105 | A1* | 2/2005 | Musson | G06F 3/0482 715/744 |
| 2005/0060365 | A1* | 3/2005 | Robinson | H04L 69/329 709/203 |
| 2005/0100157 | A1* | 5/2005 | Gray | H04M 3/4217 379/265.01 |
| 2005/0108034 | A1* | 5/2005 | Musson | G06F 3/0482 715/700 |
| 2005/0108258 | A1* | 5/2005 | Olander | G06F 3/0482 |
| 2005/0108732 | A1* | 5/2005 | Musson | G06F 3/0482 719/328 |
| 2005/0198525 | A1* | 9/2005 | Trossen | H04L 67/2857 726/22 |
| 2005/0259802 | A1* | 11/2005 | Gray | H04M 3/4217 379/201.01 |
| 2006/0036570 | A1* | 2/2006 | Schaefer | G06F 9/44505 |
| 2006/0259954 | A1 | 11/2006 | Patrick | |
| 2007/0143851 | A1* | 6/2007 | Nicodemus | G06F 21/55 726/25 |
| 2007/0156659 | A1* | 7/2007 | Lim | G06F 21/6227 |
| 2007/0156694 | A1* | 7/2007 | Lim | G06F 21/6218 |
| 2007/0220599 | A1* | 9/2007 | Moen | H04L 63/0227 726/12 |
| 2008/0172715 | A1* | 7/2008 | Geiger | G06F 21/32 726/1 |
| 2008/0194233 | A1* | 8/2008 | Henry | H04L 67/306 455/411 |
| 2008/0227458 | A1* | 9/2008 | Wu | H04W 36/0011 455/437 |
| 2008/0263225 | A1* | 10/2008 | Nadalin | G06F 21/6209 709/242 |
| 2008/0263625 | A1* | 10/2008 | Gomez | G06F 21/6218 726/1 |
| 2009/0138795 | A1* | 5/2009 | Liu | G06F 9/4421 715/234 |
| 2009/0158239 | A1* | 6/2009 | McColgan | G06F 8/00 717/101 |
| 2009/0158425 | A1 | 6/2009 | Chan et al. | |
| 2009/0178137 | A1 | 7/2009 | Branson et al. | |
| 2009/0222742 | A1* | 9/2009 | Pelton | G06Q 10/10 715/753 |
| 2009/0328136 | A1* | 12/2009 | Wan | G06F 21/6245 726/1 |
| 2010/0005478 | A1* | 1/2010 | Helfman | H04L 67/327 719/315 |
| 2010/0011148 | A1* | 1/2010 | Strassner | G06N 99/005 711/100 |
| 2010/0100955 | A1* | 4/2010 | Young | G06F 21/53 726/17 |
| 2010/0146583 | A1* | 6/2010 | Prehofer | G06Q 30/02 726/1 |
| 2010/0202291 | A1* | 8/2010 | Synnergren | H04W 76/022 370/235 |
| 2010/0299717 | A1* | 11/2010 | Nasirifard | G06Q 10/06 726/1 |
| 2011/0078758 | A1* | 3/2011 | Kohlenberg | H04M 1/72569 726/1 |
| 2011/0113471 | A1* | 5/2011 | Hjelm | H04L 12/66 726/1 |
| 2011/0239227 | A1* | 9/2011 | Schaefer | G06F 9/44505 719/313 |
| 2012/0096114 | A1* | 4/2012 | Mccolgan | H04L 67/26 709/217 |

OTHER PUBLICATIONS

McDaniel- et al.; "Methods and Limitations of Security Policy Reconciliation"; ACM Digital Library; vol. 9, No. 3, pp. 259-291; Aug. 2006.
Seshasayee-et al.; "VStore—Efficiently Storing Virtualized State Across Mobile Devices"; ACM Digital Library; pp. 43-55; Jun. 2008.
Wodka-et al.; "A Method for Securing Context-Aware Information"; IP.COM/IBM TDB; Oct. 25, 2002.
Yang, L.; "Security Specification and Enforcement in Mediation System"; Dialog/Dissertation Abstracts; 2005.
http://www.fwbuilder.org/4.0/docs/users_guide/, "Firewall Builder 4.0 User's Guide", NetCitadel, LLC., Firewheel 4. Builder.
https://www.cyberslacking.org/docs/WhitePapers/research_brief e-discovery.pdf, "E-Discovery Leaves No Stone Unturned", Websense.
Thoreson et al., Health Level 7 Data Consent Model OASIS XACML 2.0 Interop, RSA Conference 2008.
Conn, Demo shows promise for using XACML with EMRs, Apr. 10, 2008.
The XACML 2.0 RSA Conference 2008 Interop event, RSA Conference 2008, San Francisco, CA, from Apr. 7-10, 2008.
IBM, RSA 2008: XACML Patient security and privacy testbed, 2008.
Oasis, XACML 2.0 RSA 2008 Interop Scenarios Walk Through—Version 0.7, Apr. 5, 2008.
Lockhart, XACML Interoperability Demo RSA Conference 2008, BEA Systems, Apr. 7-10, 2008.
Oasis and HITSP, XACML INteroperability for healthcare, RSA conference 2008, Apr. 7-11, 2008.

(56) References Cited

OTHER PUBLICATIONS

Oasis, XACML 2.0 RSA 2008 Interop Scenarios Version 0.12, Apr. 15, 2008.
Unknown, 080401-test-case-list.txt, Apr. 15, 2008.
Zhang, G', Parashar, M: "Context-aware Dynamic Access Control for Pervasive Applications", Jan. 1, 2004 (Jan. 1, 2004), XP55002894, Retrieved from the Internet: URL:http://citeseerx.ist.psu.edu/viewdoc/download?doi=10.1.1.6.1258&rep=rep1&type=pdf.
International Business Machines Corporation, European Patent Office, May 25, 2011, 1-8, European patent Office, UK.
Zhang et al; Context-aware Dynamic Access Control for Pervasive Applications.
Zhang et al; Dynamic Context-aware Access Control for Grid Applications, Processing of the Fourth International Workshop on Grid Computing (GRID'03), 2003 IEEE.
Zhu; a Context-Aware Access Control Model for Pervasive Computing in Enterprise Environments, 2008 IEEE.
Kiyoko Tanaka et. al., "Proposal for Multicast Content Delivery Architecture Using context Information", DICOMO symposium papers, Information Processing Society of Japan, vol. 2003, No. 9, p. 117-120, Jun. 4, 2003.
Koya Mori et. al., "An Access Control Method for The Privacy Protection of Home Networks", Information Processing Society of Japan, vol. 2006, No. 14, p. 61-66, Feb. 17, 2006.
Yoichiro Morita et. al., "Dynamic Access Control Method for Ad-hoc Information Sharing", The Institute of Electronics, Information and Communication Engineers, Information and Systems Society, Human Communication, vol. 105, No. 398, p. 7-14, Nov. 8, 2005.
Guangsen Zhang et. al., "Context-aware Dynamic Access Control for Pervasive Applications", CiteSeer, Retrieved from the Internet, <http://citeseerx.ist.psu.edu/viewdoc/download;jsessionid=9F990E0A9622AAA82E043531A2FD046C?doi=10.1.1.6.1258&rep=rep1&type=pdf>.

\* cited by examiner

CONTEXT AWARE DATA PROTECTION

BACKGROUND OF THE INVENTION

1. Field of the Invention

The invention relates generally to an improved data processing system, and in particular, to a computer implemented method for improving the security of data. Still more particularly, the invention relates to a computer implemented method, system, and computer usable program code for context aware data content protection.

2. Description of the Related Art

Security of data is a well recognized need in implementing and operating data processing environments. The type of security afforded data in a data processing environment is informed by a variety of factors. For example, certain data may be accessible only by a restricted group of users and applications. As another example, certain data may be read-only and may not be modifiable. As another example, certain data may not be duplicated or moved from a designated location.

Risks associated with data tampering or data loss, corporate compliance requirements, policies and rules, asset protection, and other similar considerations are used for designing a security measure around data in a particular data processing environment. For example, a data processing environment may restrict access to certain credit card information to prevent malicious use of that information by unauthorized persons. As another example, a data processing environment may restrict access to certain product design documents embodying intellectual property of an organization to avoid undesirable distribution of those documents.

Typically, data is stored in data repositories, served by some applications, and consumed by other applications. In some cases, the repository, the server application, and the consumer application may exist in combined forms in different combinations.

In prior art, security of data is a responsibility that falls on the repository or the applications that are handling the data. The rules and policies for data security are created, administered, and enforced through these components of the data processing environment.

In certain data processing environment configurations, the creation and administration of data security policies may be a centralized function. For example, a policy management application may allow an administrator to implement a corporate policy into a rule in the policy management application. The policy management application then provides the rule to the repository or one or more applications for enforcement.

SUMMARY OF THE INVENTION

The illustrative embodiments provide a method, system, and computer usable program product for context aware data protection. Information about an access context is received in a data processing system. A resource affected by the access context is identified and the resource is received. A policy that is applicable to the access context is identified. A part of the resource to modify according to the policy is determined and the part is modified according to the policy and the access context to form a modified resource. The modified resource is transmitted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
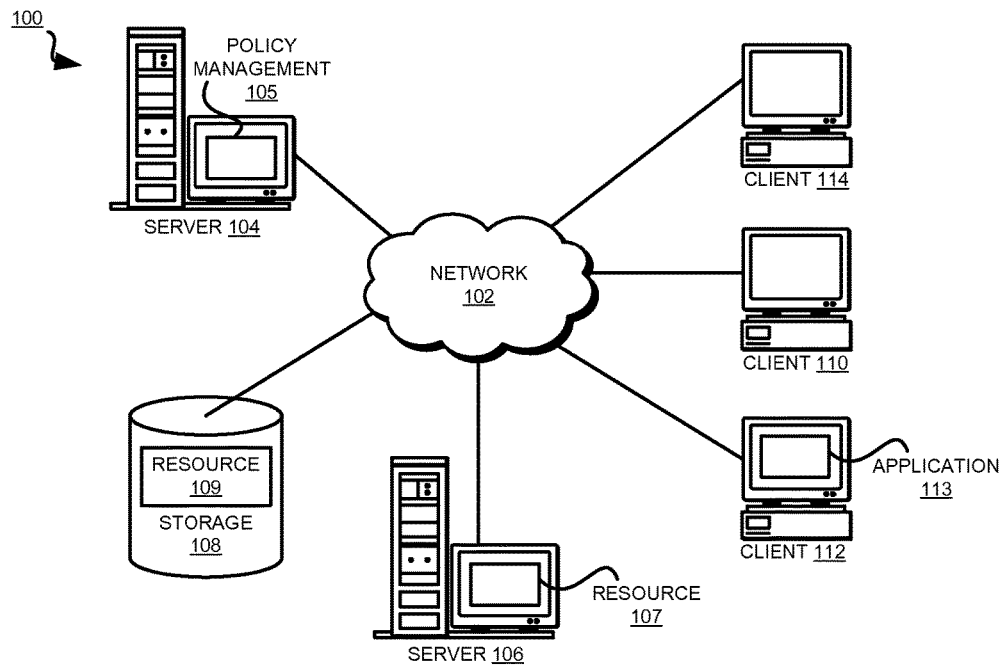
FIG. 1 depicts a pictorial representation of a network of data processing systems in which illustrative embodiments may be implemented.

The invention recognizes that prior art security of data has been largely implemented using access control based rules. The invention further recognizes that in the prior art the rules for access control are based on predefined identity information of users or applications that access the data. Furthermore, the prior art associates such identity information only with the name or identifying information of data to enforce the rules. In other words, in prior art, the identity of the user must be one of the allowed identities for particular named data, otherwise the prior art access control does not grant the user the access to the data.

For example, an existing data security model may create a rule that a file or database table labeled "credit information" may only be accessed by users or applications that present an authentication credential from an authorized list of credentials. Such rule is then enforced when an application presents an authentication credential for accessing that information.

As an example of existing enforcement, the rules are embedded in the application requesting the information. The application requires that a user provide the authentication credential, such as a user ID and a password before the application can make a request for the credit information. The application matches the supplied user ID and password in a list stored locally or remotely. The application submits the request for the credit information if the user ID is one of the authorized IDs that can access that information according to that list.

As another example, a prior art data security model may create a rule restricting access to a patient's medical history file to only an identified role—a doctor. In the prior art, however, such a rule is embedded in the repository where the patient files are stored. When an application presents a user's credentials to access a patient's medical history, the repository determines whether the credentials are those of a person in the role of a doctor. The repository provides the patient's medical history record if the credentials are those of a doctor.

In some cases, a prior art repository also determines whether the doctor is the doctor associated with the patient's record or a different doctor. For example, the repository will allow access to John Doe patient's medical history file only by a doctor belonging to "John Doe's Doctors" user group.

The invention recognizes that in the prior art, data security measures are unable to take into account the access context in which certain data is accessed. For example, a particular doctor should be allowed access to John Doe's medical history all the time because the doctor is John Doe's primary doctor. However, any doctor belonging to intensive care unit of a hospital should be allowed similar access if the file is being accessed within the access context that John Doe is in fact in intensive care at or about the time of access.

Furthermore, a paramedic may also be allowed access in other access contexts, such as from an ambulance before John Doe is admitted to intensive care. The paramedic's access should be terminated once John Doe is admitted to intensive care unit. Another user, such as an ER doctor, should be granted access until John Doe's file shows that John Doe's condition has stabilized, he has been moved out of intensive care, or other similar considerations.

In accordance with the invention, circumstances of accessing the data, access implications of the data content itself, or events unrelated to the data access but potentially affecting protection of the data are collectively called access contexts. Removing access for the ER nurse staff when a patient's data shows that the patient is in a regular recovery room, is an example of an implication of the data content.

An access context can be a single access context or a group of access contexts. An access context can affect present access to data or future access to data. Changes in the circumstances of accessing the data, changes in the data content itself that affects access to the data, or event transitions that have can potentially affect access protection of the data are collectively called access context changes. An access context change can be a single access context change or a sequence of access context changes.

Another way of understanding access contexts and changes thereto is in relation to state models. Events and activities in a data processing environment can be mapped to one or more processes. The one or more processes can be represented as state diagrams. An event or an activity may represent a state transition or if the event is continuous, a state in the state diagram. The access context may be represented by a state. The event in relation to another event, for example, a previous event in the same process, may also represent a state transition. For example, admitting a patient to intensive care may be an event represented as a state transition and the patient being in intensive care may be one state. The patient being discharged may be an event in the patient management process represented by another state transition. The access context of the patient being discharged is another state. The discharge event in relation to the admission into intensive care event may be or imply a state transition.

As another example, an event in one process may be related to another event in another process, changing the access context, and can also represent a state transition. For example, a patient management process may include a possible state of diagnosing a patient. Another process, such as an employee management process at a hospital may have an event of termination of a doctor. A particular doctor leaving the hospital's employment may be an event in the state model of the employee management process. This event may cause a state transition in the patient management process of a particular patient whose primary care doctor was the doctor that left the hospital's employment because that doctor can no longer treat that patient.

State models of certain processes or parts thereof may represent a set of access contexts within which data may be accessed. State transitions in such a state model may represent context changes.

In the example of John Doe's medical history file, being in the ambulance, being admitted to intensive care, being discharged from intensive care, general access by a primary doctor are some examples of access contexts in which the data of the medical file may be accessed. Transitioning from one access context to the next, such as being moved from the ambulance to the intensive care unit, is an example of an access context change.

Prior art methods for data security are static in their application. Prior art data security methods use policies that are designed statically at discrete times unrelated to the access contexts, to with, contexts of data access. The invention recognizes that prior art methods of data security, including policy management applications, do not account for the access context in which certain data may be accessed.

The invention further recognizes that the prior art systems and methods incorporate data security policies that are pre-determined and fixed in code. Accordingly, the prior art systems and methods are typically unable to adjust data security policies together with or in anticipation of access context changes. Using prior art to effect a change in security measures around certain data, the policy change, rule implementation, and the changed rule enforcement is largely a manual determination.

The invention further recognizes that the prior art policies and rules thus implemented are often embedded in the applications that request the secured data or in the repositories that serve such data. Accordingly, the invention recognizes that changes to policies and rules often require code change in applications. The invention recognizes that at least for this reason, the policy changes are infrequent and distributed at discrete times unrelated to events and access context changes as they occur in the data processing environment.

The illustrative embodiments used to describe the invention generally address and solve the above-described problems and other problems related to data security. The illustrative embodiments provide a method, computer usable program product, and data processing system for context aware data protection.

An embodiment of the invention may enable the data processing system to manage access to data while accounting for the access context in which the data may be accessed. Access to or other manipulation of data may be adjusted as access context changes occur in the data processing environment. Further, access to or other manipulation of data may be adjusted in anticipation of access context changes.

Furthermore, data protection in an access context aware manner according to an embodiment may provide context aware data protection while leaving existing applications and repositories in their prior art form—unaware of the effects of access contexts and access context changes. Additionally, an embodiment may separate the policies, and rules based on the policies, from the applications and repositories, leaving only enforcement thereof in the purview of the applications and repositories.

An embodiment may allow dynamic and near real time manipulation of data and data security in response to changes in the access contexts. Additionally, an embodiment may allow such dynamic and near real time manipulation without stopping applications, implementing code changes, or interrupting operations of a data processing system.

Furthermore, an access context or a change in the access context is determined dynamically. For example, access contexts and changes therein may be evaluated concurrently with events as the events occur in a data processing environment. For example, at the time an event occurs in a data processing system, a near-real-time determination can be made whether the event causes an access context to arise for a specific resource.

As another example, an access context and changes therein may be determined at the time a resource is accessed. For example, at the time a request for access to a file is received in a data processing system, a determination can be made whether an access context exists, or a change to an existing access context has occurred, that affects access to that file.

The illustrative embodiments are described with respect to certain data, data structures, indicators, and identifiers only as examples. Such descriptions are not intended to be limiting on the invention. For example, an illustrative embodiment using a bit flag to indicate an access context change can be implemented using an event message in a similar manner within the scope of the invention.

Furthermore, the illustrative embodiments may be implemented with respect to any type of data processing system. For example, an illustrative embodiment described with respect to a multiprocessor standalone data processing system may be implemented in a multiprocessor logical partition system within the scope of the invention. As another example, an illustrative embodiment described with respect to an application may be implemented with respect to a server application, a client application, a database, or any other software application or system.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
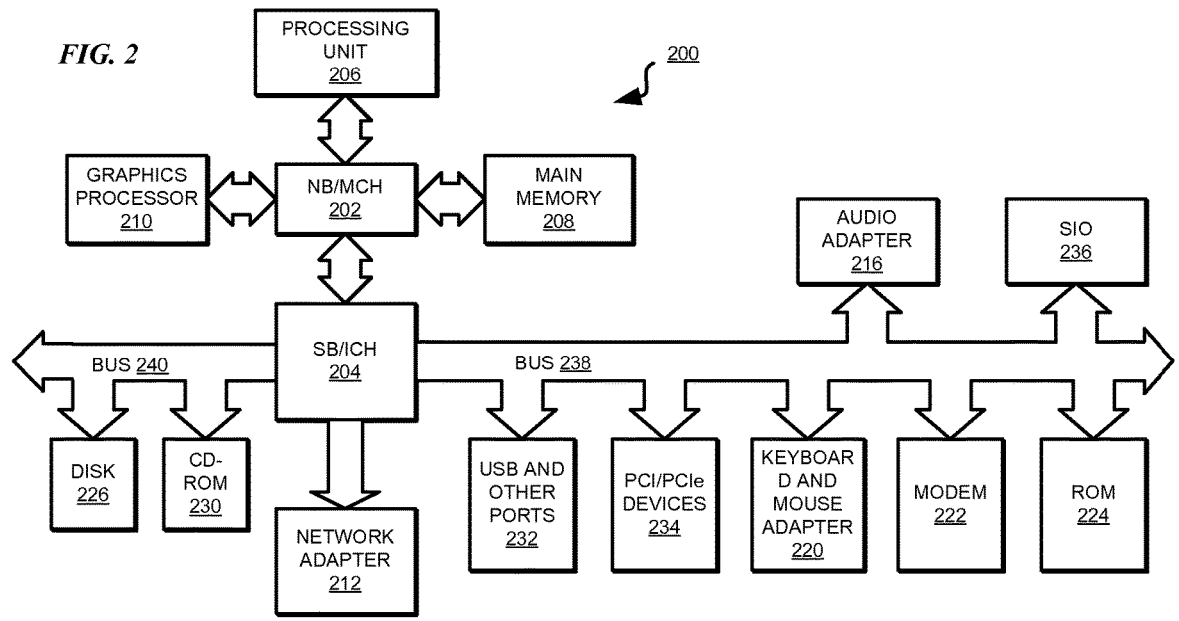
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include policy management application 105. Policy management application 105 can be an application, system, or a component thereof, according to an embodiment of the invention. Server 106 includes resource 107. Storage 108 includes resource 109. Resources 107 and 109 are resources subject to data protection using an embodiment of the invention. Resources 107 and 109 can each be data in any form or structure. Application 113 in client 112 is an example application wishing to access or manipulate resource 107, 109, or both.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
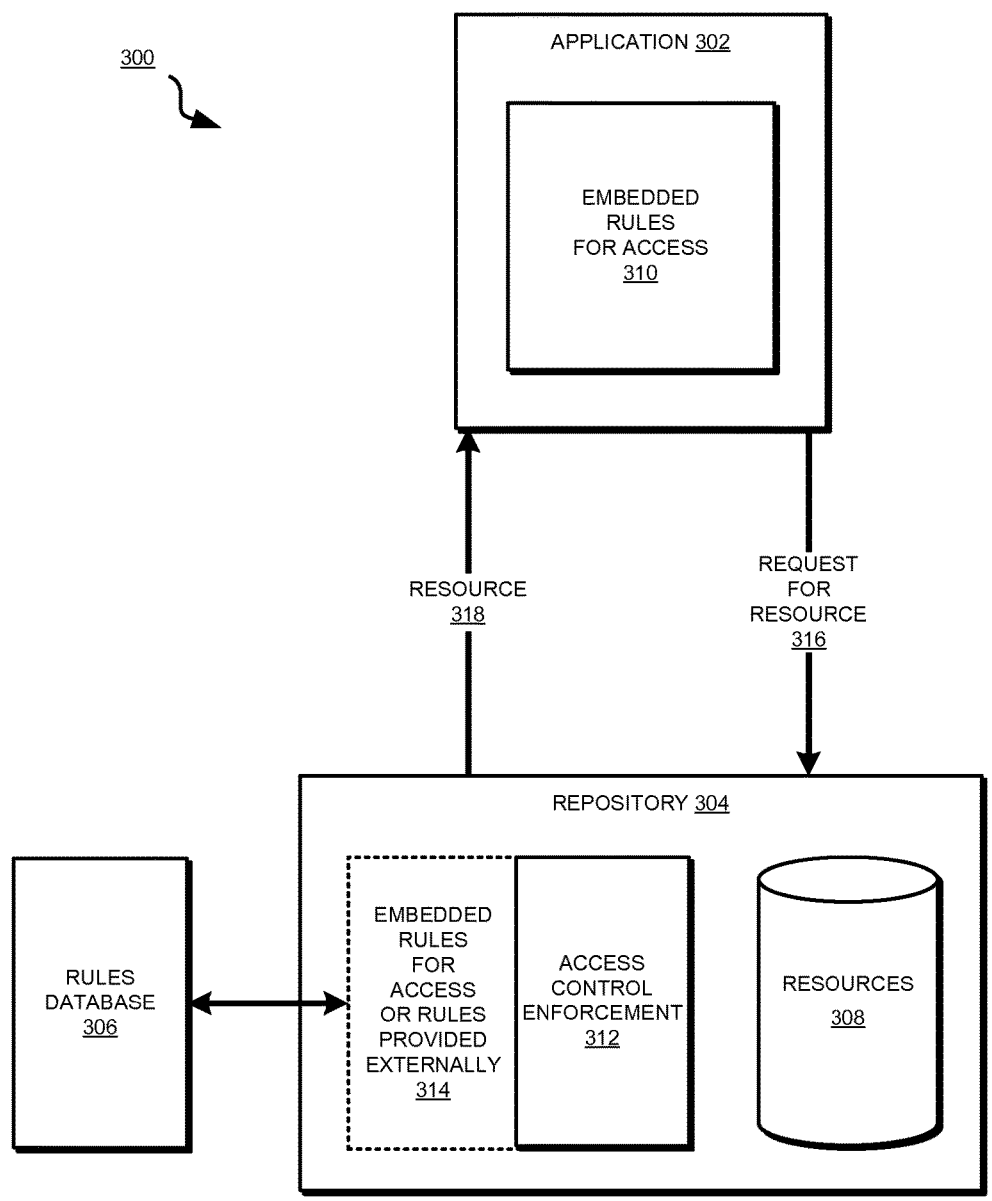
FIG. 3 depicts a block diagram of data security configuration with respect to which an illustrative embodiment may be implemented.

With reference to FIG. 3, this figure depicts a block diagram of a data security configuration with respect to which an illustrative embodiment may be implemented. Configuration 300 includes application 302, which may be similar to application 113 in FIG. 1. Repository 304 may be similar to storage 108 or server 106 in FIG. 1. Rules database 306 may be a component of a prior art policy management system that is similar to policy management application 105 in FIG. 1.

Application 302 is an example of an application for accessing resources 308. Resource 308 may be secured in some way. Resources 308 may be one or more resource, such as resource 109 in FIG. 1. A resource includes data. For example, a resource may be a patient's file at a hospital, including the data of the patient's medical history, diagnoses, insurance, and responsible doctors. As another example, a resource may be the records related to a patient. Data of the resource may be a set of database entries retrievable by a suitable query.

To manage access to resources 308, application 302 typically includes access control mechanism embedded in the form of embedded rules for access 310. Embedded rules 310 inform application 302 how to validate a request for a resource in resources 308.

Embedded rule 310 may take the form of coded logic, a file, or a database, or any other form suitable for a particular implementation of application 302. In some instances, embedded rules 310 may be default rules to use for requesting resources 308. In other instances, embedded rule 310 may be supplemented by rules from an external source, such as rules database 306.

Repository 304 typically includes security component 312 for access control enforcement. Component 312 enforces access control rules 314 for managing security of resources 308. Access control rules 314 may be embedded in repository 304 or may be supplied from an external source, such as rules database 306.

In prior art operation, application 302 may validate a request for a resource from resource 308 using embedded rules 310. Upon meeting the requirements of embedded rules 310, application 302 passes request 316 to repository 304. Repository 304 may further use component 312 to enforce any rules in access control rules 314. Repository 304 may return resource 318 to application 302, resource 318 being a resource in resources 308.

As recognized by the invention, prior art embedded rules 310, prior art access control rules 314 and other similar implementations are not responsive to the access context of making request 316 or providing resource 318. Rules 310 and 314 are pre-coded and cannot change dynamically in response to access context changes. Furthermore, pre-coded rules 310 or 314 within themselves embed very limited knowledge of pre-determined access contexts, access context changes, events in the data processing environment, and their relationship to the contents of resources 308. Particularly, configuration 300 includes no mechanism through which knowledge about the content of resources 308 may be obtained and associated with access contexts and access context changes. The invention recognizes that the same access context change can modify access to different resources differently depending upon the knowledge about the contents of those resources.

Knowledge about the contents of a resource is not limited to the attributes that define the resource. The knowledge further includes information directly included in the content of the resource and information derivable or inferable from such content. Thus, the knowledge obtained from the resource is the knowledge about access contexts of the resource. Further, this knowledge may be mined from the data of the resource for evaluating an access context or an access context change.

Knowledge about the contents of a resource is usable for making substantive decisions with respect to the resource. In the prior art, a human has to infer such knowledge from available resources and a human makes any substantive decisions using such knowledge using a manual decision-making process. The extraction of the knowledge and the decisions made using the knowledge are non-trivial steps for an application or system to perform using the resources. The invention provides some example embodiments for programmatically extracting and using the knowledge in an automated decision-making process.

Figure 4:
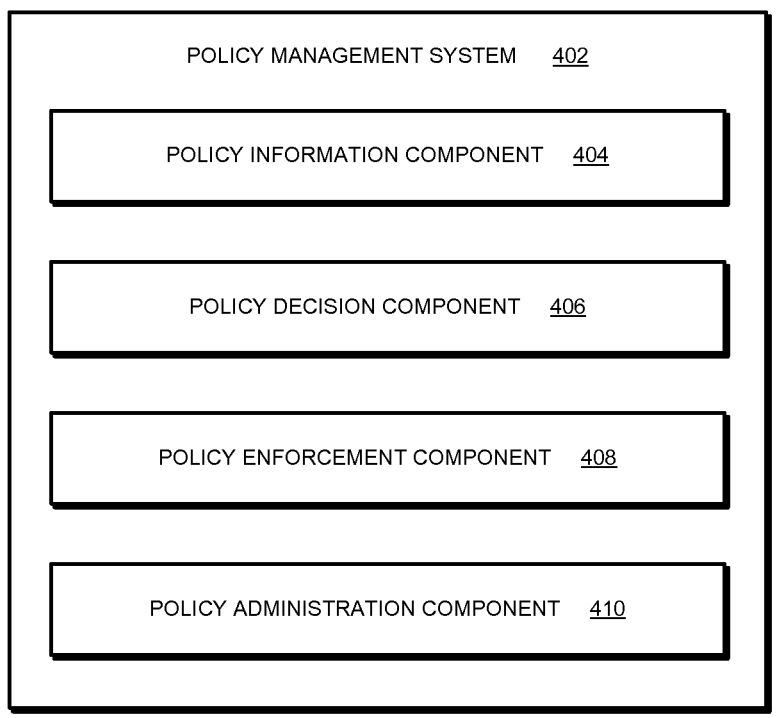
FIG. 4 depicts a block diagram of a policy management system in accordance with an illustrative embodiment.

With reference to FIG. 4, this figure depicts a block diagram of a policy management system in accordance with an illustrative embodiment. Policy management system 402 may be used as a replacement for rules database 306, embedded rules 310 in FIG. 3, or both.

Components of policy management system 402 are chosen only to illustrate the functional aspects of policy management system 402. Such components are not intended to be limiting on the invention and other implementations including similar functions and features are contemplated within the scope of the invention.

Policy information component 404 provides knowledge about the contents of a resource, subject, or environment. In one embodiment, policy information component 404 may detect a set of attributes associated with a resource. A resource may be similar to a resource in resources 308 in FIG. 3. A set of attributes is zero or more attributes. Some examples of attributes of a resource may be the resource's filename, file path, date of last modification, size, and read-write-execute permissions.

Policy information component 404 may further determine a set of parameters associated with the resource. A set of parameters is zero or more parameters. Some examples of such parameters may be ownership of the resource, index of the resource, authorized copies and their locations, notification triggers, and dependencies on other resources.

Policy information component 404 may further include capability of opening the resource and retrieving the contents. For example, if the resource is a text file, component 404 may parse the file to identify keywords. As another example, if the resource is a database table, policy information component 404 may identify rows that contain values in a certain range for certain columns.

Policy information component 404 may further be configured to determine relevance of access context or access context change to the content, relation of the content, and to determine the modifications that can be performed on attributes, parameters, or contents of the resource. Modification of a resource may include modifying an attribute of a resource, a parameter associated with a resource, a portion of the contents of the resource, a feature of the resource, an aspect of a container of the resource, performing similarly purposed actions on other similarly usable data, or a combination thereof.

Policy information component 404 performs these and other similar actions according to the access context of requests for the resource, changes in those access contexts, or other events occurring in the data processing system. For example, an event in a hospital data processing system may be that a particular doctor has left the hospital. A relevance of this event to John Doe's medical history file may be that that doctor was treating John Doe in intensive care. Policy information component 404 may retrieve the content in John Doe's record, which may have to be updated due to this event. A different component in the policy management system may update the content of the appropriate resource and store the updated resource into the repository.

In another embodiment, policy information component 404 may provide knowledge about a subject. For example, policy information component 404 may provide an identifier associated with a requestor requesting the resource. In general, policy information component 404 may provide information associated with an identity that is presently attempting, or in future may attempt, to access the resource.

In another embodiment, policy information component 404 may be an access context component in that policy information component 404 may provide access context about an environment. For example, policy information component 404 may provide an identifier associated with a data processing environment within which the resource may be requested. In general, policy information component 404 may provide information associated with an application, a data processing system, a network, a configuration, or any other environment related factor that may influence access to the resource.

Policy decision component 406 determines the policies that may be applicable to a resource, given the access contexts and access context changes in the data processing system. Policy decision component 406 may respond to access context changes or events in the data processing system by providing information about configuration changes that should be made in the resource, in a data processing system, an application, or a component thereof, given the knowledge of the resource, the access contexts, and the access context changes. The configuration change may result in changes to the attributes, parameters, or contents of the resource.

For example, in one embodiment, policy decision component 406 may select a subset from a set of policies. A set of policies is one or more policies. A policy may be generically applicable to multiple resources or specific to a particular resource. A policy may be encoded such that the policy is applicable to a set of resources regardless of their location. A set of resources is one or more resources.

A policy may also be encoded such that the policy is applicable to a set of subjects. A subject is a requestor, consumer, destination, origin, source, provider, or an intermediary system or application, of a resource. A set of subjects is one or more subjects. A rule includes implementation logic for all or part of a policy. A rule may also include logic that may be useful in implementing the policy but may not have been specified in the policy.

A policy may also be encoded to apply to a set of conditions. A condition is one or more conditions. For example, continuing with the medical records example, a condition may be the occurrence of an event, such as a particular doctor leaving the hospital. Another example condition may be the presence of a certain data in the content of a resource, such as the treating doctor's name. Another example condition may be the presence of an access context in the data processing system, such as the presence of a patient in a particular wing of a hospital. Another example condition may be a change from one particular access context to another, such as the discharging of the patient from the hospital.

An example policy may provide—if a doctor leaves the hospital, any records on which the doctor's name appears should be modified to include a different doctor's name. Another example policy may provide—the user ID of the doctor leaving the hospital should be assigned to the doctor's supervisor for a preset period. A third example policy may be specifically for John Doe's record, such that—when a doctor who has left the hospital is John Doe's treating doctor, no one including the doctor's supervisor may access John Doe's record except a named individual. Policy decision component may select all three of these example policies when a doctor leaves the hospital where John Doe's records are in use.

Policy enforcement component 408 may provide enforcement actions based on the applicable policies, configuration changes, or a combination thereof. The enforcement actions may be directed to one or more affected resources, specifically identified resources, a system configuration, an application configuration, a workflow process, or a combination thereof. For example, continuing with the example policies above, policy enforcement component 408 may determine several enforcement actions. The leaving doctor's user ID has to be reconfigured to allow access to the supervisor; the user ID has to be configured to expire at a preset time in the future; contents of one or more resources that include the leaving doctor's name have to be modified to the default doctor's name; and an access parameter of the resource associated with John Doe's record has to be modified to exclude the doctor's user ID.

Policy administration component 410 may provide capabilities for creating, managing, modifying, or otherwise manipulating policies. Policy administration component 410 may further provide capabilities for configuring access contexts and access context changes to be detected.

Policy administration component 410 may further provide capabilities for associating resources with the access contexts and access context changes, and with one another. Policy administration component 410 may further provide capabilities for correlating the knowledge of the resources and subjects with access contexts and access context changes.

These components of policy management system 402 are described only as examples and are not intended to be limiting on the invention. The functions, example implementations, and example operations of these components are also similarly not intended to be limiting on the invention. These and other similar functions, operations, actions, configurations, and components will be conceivable from this disclosure and the same are contemplated within the scope of the invention.

Figure 5:
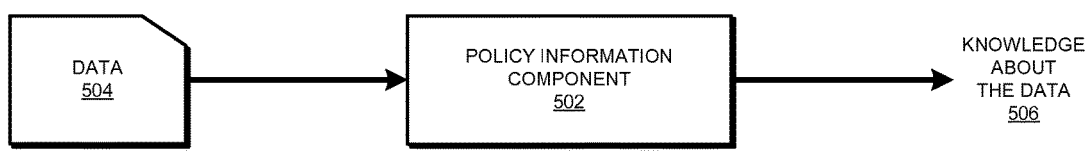
FIG. 5 depicts a block diagram of a policy information component of a policy management system in accordance with an illustrative embodiment.

With reference to FIG. 5, this figure depicts a block diagram of a policy information component of a policy management system in accordance with an illustrative embodiment. Policy information component 502 may be implemented as policy information component 404 in FIG. 4.

In operation, policy information component 502 receives data 504, which may be any information associated with a resource or the data resource itself. For example, data 504 may be attributes, parameters, or contents of a resource; attributes, parameters, or configuration of a system; or a combination thereof.

Policy information component 502 provides as output knowledge 506 about the data. For example, knowledge 506 may include relevance of certain contents of a resource to certain events occurring or about to occur in a data processing system. Policy information component 502 may provide knowledge 506 in the manner described with respect to policy information component 404 in FIG. 4.

Figure 6:
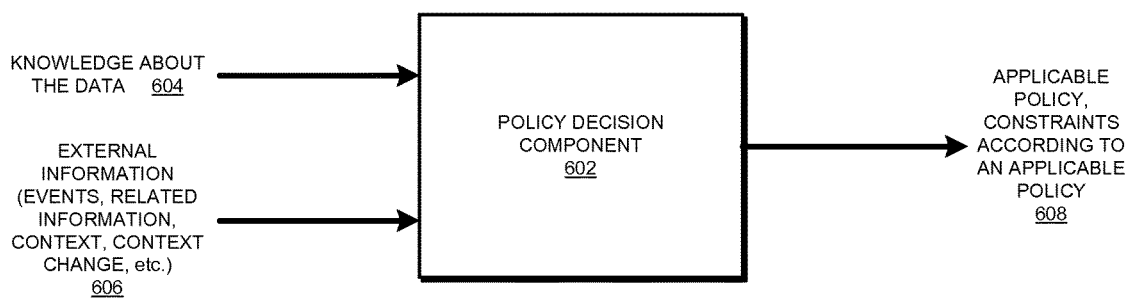
FIG. 6 depicts a block diagram of a policy decision component of a policy management system in accordance with an illustrative embodiment.

With reference to FIG. 6, this figure depicts a block diagram of a policy decision component of a policy management system in accordance with an illustrative embodiment. Policy decision component 602 may be implemented as policy decision component 406 in FIG. 4.

In operation, policy decision component 602 receives knowledge about data 604, which may be, for example, an output of policy information component 502 in FIG. 5. Policy decision component 602 also receives external information 606. External information 606 may include information about access contexts or access context changes, such as events occurring in a data processing system.

Given the inputs, policy decision component 602 provides as output 608 a set of applicable policies or rules according to certain policies. For example, output 608 may include a policy. As another example, output 608 may include information not provided in a policy, such as a constraint or restriction on a particular attribute, a constrained or modified value or value range for a configuration parameter, or a combination thereof.

Figure 7:
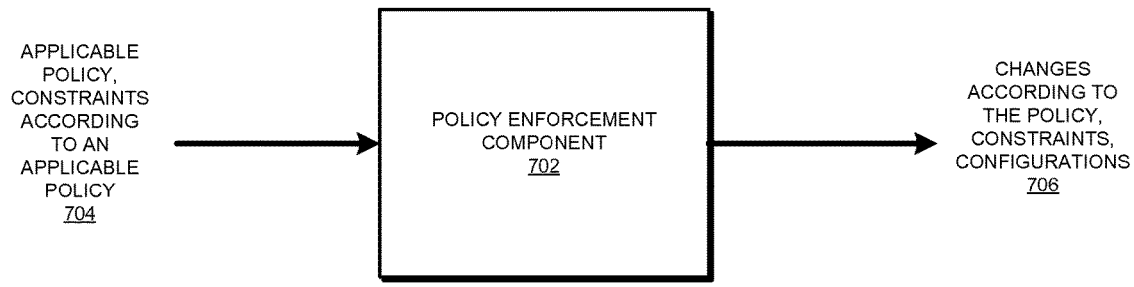
FIG. 7 depicts a block diagram of a policy enforcement component of a policy management system in accordance with an illustrative embodiment.

With reference to FIG. 7, this figure depicts a block diagram of a policy enforcement component of a policy management system in accordance with an illustrative embodiment. Policy enforcement component 702 may be implemented as policy enforcement component 408 in FIG. 4.

In operation, policy enforcement component 702 receives applicable policies, constraints, or a combination thereof, as input 704. For example, input 704 may be output 608 in FIG. 6.

Policy enforcement component 702 provides output 706. Output 706 includes change actions according to the applicable policies. For example, a policy in the applicable policies may invoke another policy. In one embodiment, output 706 may manipulate attributes, parameters, contents, configurations, or workflows, such as by directing another process to perform such manipulations.

Figure 8:
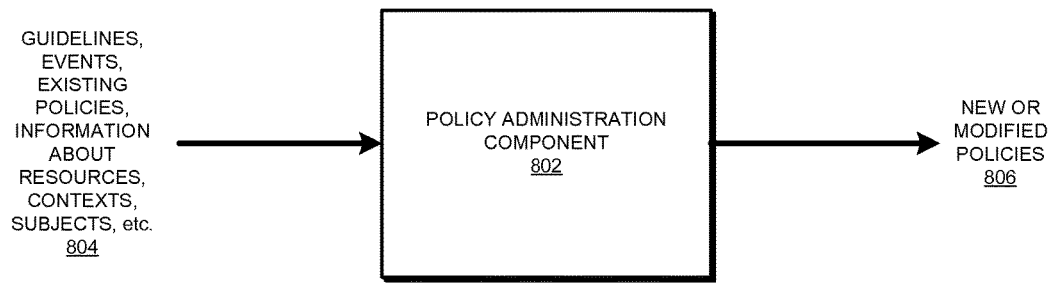
FIG. 8 depicts a block diagram of a policy administration component of a policy management system in accordance with an illustrative embodiment.

With reference to FIG. 8, this figure depicts a block diagram of a policy administration component of a policy management system in accordance with an illustrative embodiment. Policy administration component 802 may be implemented as policy administration component 410 in FIG. 4.

In operation, policy administration component 802 receives input 804. Input 804 may include but may not be limited to any input that policy administration component 410 in FIG. 4 is described to receive. For example, input 804 may include security guidelines, existing policies, information about resources, information about access contexts and access context changes, information about subjects, or a combination thereof.

Some of the inputs may be from other components of a policy management system according to an embodiment. A user, such as an administrator, can provide information as input to policy administration component 802. For example, an input may be an extension of the validity date of an existing policy. Policy administration component 802 may include user interface, logic, or code to apply an input to a policy. As an example, a fillable form presented by policy administration component 802 may receive inputs from a user that may be combined into a policy by using logical or mathematical operators in the form.

Policy administration component 802 provides as output 806 new or modified policies, rules, information usable in processing policies and rules, or a combination thereof. In one embodiment, policy administration component 802 may include an interface component, such as a graphical user interface, for facilitating policy administration function.

Figure 9:
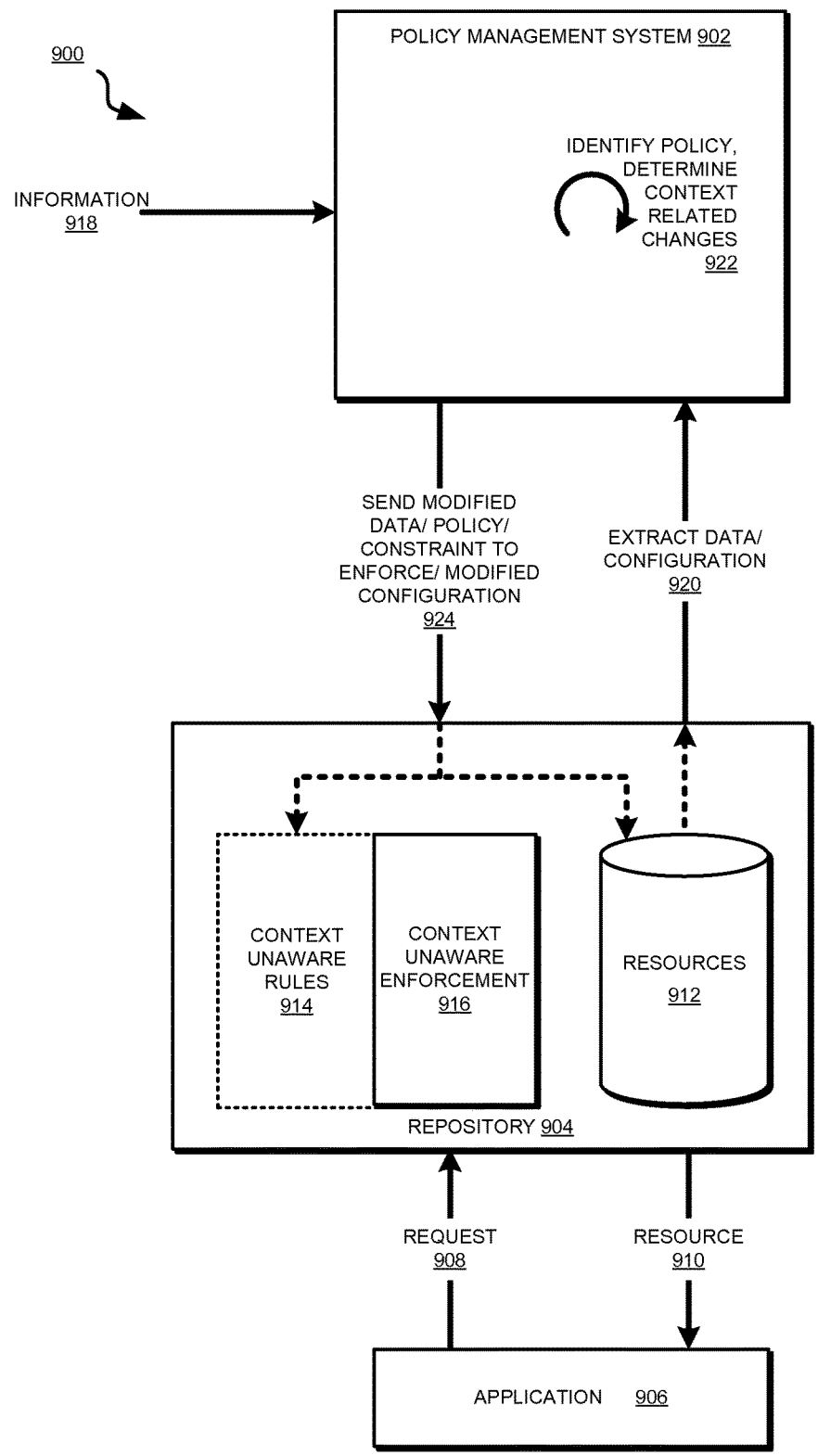
FIG. 9 depicts a block diagram of a configuration of context aware data protection in accordance with an illustrative embodiment.

With reference to FIG. 9, this figure depicts a block diagram of a configuration of context aware data protection in accordance with an illustrative embodiment. Configuration 900 may be implemented using configuration 300 in FIG. 3 and policy management system 400 in FIG. 4.

Policy management system 902 may be implemented using policy management system 400 in FIG. 4. Repository 904 may be similar to repository 304 in FIG. 3. Application 906 may be similar to application 302 in FIG. 3.

Application 906 may be an application that may send request 908 for a resource to repository 904. Application 906 may be unaware of access contexts and access context changes in the data processing environment, and may make request 908 using application 906's existing code.

Repository 904 may provide resource 910 from resources 912. In supplying resource 910, repository 904 may execute one or more rules 914 using enforcement component 916.

An embodiment may not require code modification for repository 904 and enforcement component 916 for implementing access context based data protection. From repository 904's perspective, repository 904 continues to enforce rules 914, which may be stored or supplied in the manner existing rules are supplied in prior art. As far as repository 904 is concerned, rules 914 appear to be access context unaware, requiring no awareness of access context or access context changes on the part of repository 904.

Similarly, enforcement component 916 continues to enforce rules 914 in an access context agnostic way. In other words, enforcement component 916 need not be modified to include any awareness of access contexts or access context changes.

In one embodiment, policy management system 902 may operate with repository 904 in the following example way. Policy management system 902 accepts information 918 about access contexts being created and access context changes occurring in a data processing system.

In one embodiment, policy management system 902 may poll or monitor for information 918 to detect access contexts and access context changes. For example, policy management system 902 may listen for event messages being communicated in a system and act on event messages that are of interest.

In another embodiment, policy management system 902 may receive information 918 indicative of access contexts and access context changes. For example, application 906 may cause a flag to be set in a data processing system when certain activities occur in application 906. The flag setting can form information 918 from which policy management system 902 may determine a change in an access context.

For example, if patient John Doe's record was accessed from intensive care unit previously and is subsequently accessed from an in-patient room, patient John Doe may have been moved and the access context may have changed. Accordingly, application 906, which may be a medical records accessing application, may generate an event that may be detected by policy management system 902 as information 918.

As another example, a product related document may be marked confidential before the product is released. A release announcement of the product may be an event raised by an application, such as a calendar application. Policy management system 902 may detect the event as information 918. An attribute of the document may have to be changed from confidential to public in response to such an event.

Depending on information 918 received about the access contexts or access context changes, policy management system 902 may identify one or more resources or configurations in repository 904 that are affected by information 918. Policy management system 902 extracts or receives data 920 of a resource, for example, the contents or the configuration data of the resource, from repository 904. In one embodiment, policy management system 902 may retrieve, such as by request and response, the resource or configuration data 920. In another embodiment, another system or application, including repository 904, may transmit data 920 to policy management system 902 without the data being requested.

Policy management system 902 performs operation 922 using information 918 and data 920. In performing operation 922, policy management system 902 identifies applicable policies and constraints to received data 920. Policy management system 902 may identify access context related changes, modifications, or other manipulations of data 920 based on the identified policies and constraints. For example, policy management system 902 may perform operation 922 described using a combination of policy information component 502 in FIG. 5, policy decision component 602 in FIG. 6, or policy enforcement component 702 in FIG. 7.

Policy management system 902 sends data 924 to repository 904. Data 924 may be modified form of data 920 or information to modify data 920. Data 924 may alternatively be policy information to enforce at repository 904.

For example, data 922 may be a rule according to an applicable policy that should be stored as an access context unaware rule in rules 914 in repository 904. Repository 904 may enforce such a rule just like any other rule using context unaware enforcement component 916.

As another example, data 922 may be a modified resource to be stored in resources 912. The modified resource may include a modified or new attribute or parameter, modified or new content, or a combination thereof. For example, authorized group of doctors associated with the record of John Doe may be changed in the modified resource upon John Doe's move from the intensive care unit to the in-patient room.

In one embodiment, policy management system 902 may include an editing component (not shown). Policy management system 902 may provide a context aware rule to the editing layer. The editing component may edit a resource according to the rule, and place the edited resource back in repository 904.

In an embodiment, policy management system 902 operates with repository 904 asynchronously with respect to requests for resources being submitted to repository 904. In other words, policy management system 902 may operate on a resource or configuration of repository 904 before, while, and after a request for a resource is submitted to repository 904. Furthermore, policy management system 902 may operate on a resource or configuration of repository 904 that may or may not be related to a resource being requested from repository 904 at the time of the operation.

In another embodiment, policy management system 902 may operate with repository 904 in a synchronous manner when repository 904 calls policy management system 904. Such an embodiment may be more expensive as compared to the asynchronous embodiment in terms of system resources in some implementations.

Such an embodiment, where repository 904 calls out to policy management system 902 for the particular resource that is being requested in request 908, may also be slower in performance as compared to the asynchronous embodiment. For example, a response to request 908 may have to wait until policy management system 902 can provide the context aware data protection features related to the requested resource.

Although both embodiments accomplish similar objectives and are within the scope of the invention, certain implementations may prefer an implementation similar to the asynchronous embodiment over the call out embodiment. Conversely, certain implementations may prefer the call out embodiment to the asynchronous embodiment if the implementation prefers tight control on modification of resources 912, is concerned about resources consumed by policy management system 902, wishes to implement policies only on an as-needed basis, or a combination thereof.

Figure 10:
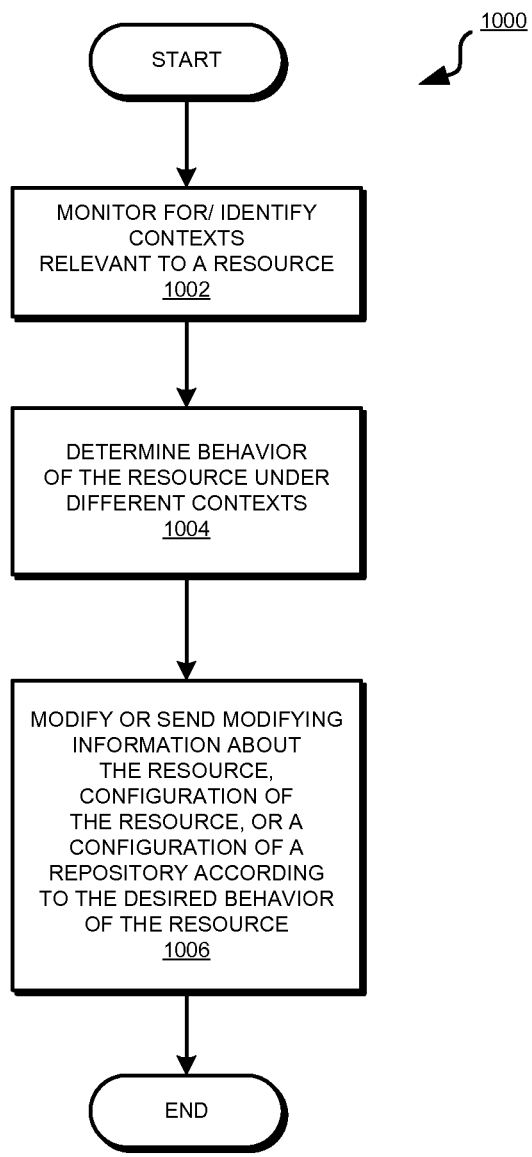
FIG. 10 depicts a flowchart of a process of context aware data protection in accordance with an illustrative embodiment, and with reference to FIG. 11, this figure depicts a block diagram of an example implementation in accordance with an illustrative embodiment.

With reference to FIG. 10, this figure depicts a flowchart of a process of context aware data protection in accordance with an illustrative embodiment. Process 1000 may be implemented in a policy management system, such as policy management system 902 in FIG. 9.

Process 1000 begins by monitoring for and identifying access contexts and changes in access contexts (step 1002). For example, process 1000 may perform step 1002 by receiving information 918 in FIG. 9.

As another example, process 1000 may receive information about access contexts and access context changes from a specification, such as when policies are being created or modified. In such a case, process 1000 may receive the information in step 1002 without the events actually occurring, access contexts actually being created, and access contexts actually changing in a data processing environment. In other words, process 1000 may receive information 1002 while remaining in a present access context.

Process 1000 determines the desired behavior of various resources and systems according to the information of step 1002 (step 1004). For example, process 1000 may perform step 1004 by identifying the resources affected by the access contexts or access context changes identified in step 1002. Further, in step 1004, process 1000 may also determine attributes, parameters, content, or configuration of the identified resource or system that should be modified, added, deleted, or otherwise manipulated.

Process 1000 may modify the identified resources or configurations according to the desired behavior (step 1006). Process 1000 ends thereafter.

In step 1006, instead of or in addition to modifying, process 1000 may send information usable for modifying the resource or configuration to another process. For example, process 1000 may send a rule to the repository as described with respect to FIG. 9 in step 1006. The repository may then use the rule in enforcing access control.

Process 1000 may send the modified information or the information usable for modifications to a system or application after step 1006. In one embodiment, process 1000 may send such information upon request from a system. The system receiving the modified information or the information usable for modifications may be a system other than the system that provided the resource and configuration in the processing of step 1004.

Figure 11:
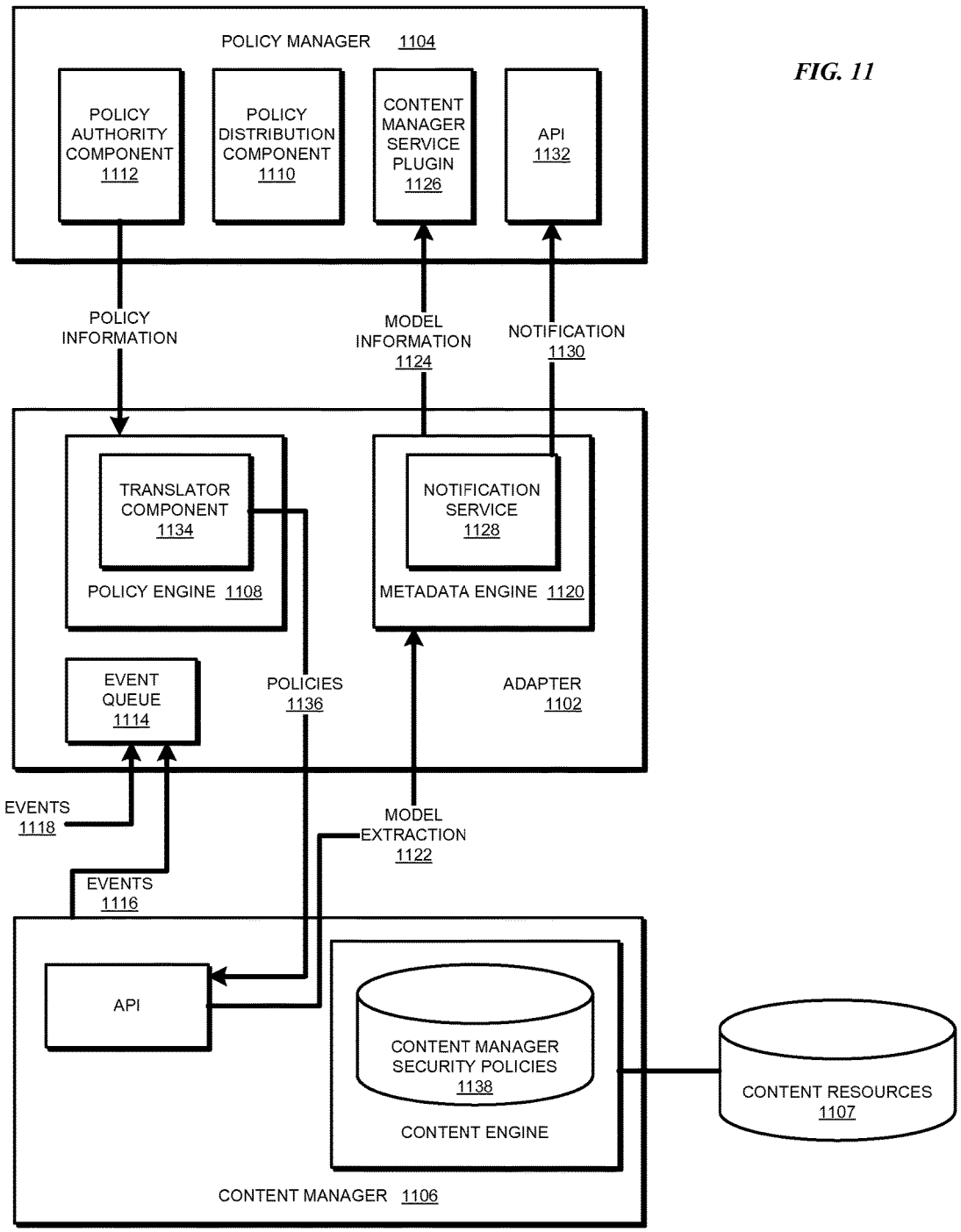

With reference to FIG. 11, this figure depicts a block diagram of an example implementation in accordance with an illustrative embodiment. Some aspects of the embodiment have been implemented in adapter 1102 for policy manager 1104. Adapter 1102 is designed to interface policy manager 1104 with content manager 1106. Content manager 1106 hosts content resources 1107. Adapter 1102 includes policy engine 1108. Policy engine 1108 receives policy information from policy distribution component 1110 of policy manager 1104. Policy manager 1104 also includes policy authoring component 1112 that assists in authoring the policy in any desirable format. For example, a policy authoring component 1112 may create a policy in eXtensible Access Control Markup Language (XACML) or a target policy repository's native semantics. Accordingly, policy information received by policy engine 1108 may be a policy in XACML form or another form suitable for deploying in content manager 1106.

Event queue 1114 in adapter 1102 receives information 1116 from content manager 1106 and information 1118 from other data processing systems. Using information 1116 and 1118, adapter 1102 can determine the changes in content manager 1106 caused by access context changes.

Metadata engine 1120 performs model extraction services 1122 using information about the content manager models.

Metadata engine 1120 sends extracted model information 1124 to content manager service plugin 1126 in policy manager 1104.

A content manager model may be, for example, a hierarchical organization of resources in the content manager. As another example, a content manager model may be a logical view constructed for a part of a database in which resource contents may be stored.

The metadata extracted from the model may be the instance level view of the model. In the example of the hierarchical model, the metadata may be the data describing the resources present at the nodes of model's hierarchy.

Notification service 1128 in adapter 1102 sends notification 1130 to policy manager 1104 using API 1132 if any metadata changes occur in the model, such as due to an event in event queue 1114. Translator component 1134 in adapter 1102's policy engine 1108 supplies or applies modified policies 1136 to content manager 1106, such as by updating content manager 1106's security policies repository 1138.

In an example operation, an example model may be in use in content manager 1106. A resource in the model may change due to an event—an access context change, causing a change in the metadata of the resource. The change in the metadata is communicated to policy manager 1104. Policy authoring component 1112 may create or revise a policy using the model, the change in the metadata, and the access context change. The new or revised policy is communicated to translator component 1134, which may update policy repository 1138 with the new or revised policy. In another example operation, the new or revised policy can be applied at policy engine 1108 to one or more node resources in the model in response to the access context change.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are is provided in the illustrative embodiments for context aware data protection. Using the embodiments of the invention, a data processing system can protect data and resources in response to changing access contexts and events that may occur in that or another system. Using the embodiments, a data processing system can operate with improved security of information as compared to the security afforded by static rules and manual response to events.

The rules described in particular embodiments are only examples and are not intended to limit the scope of the invention. Any rule may be implemented in a manner similar to the rules described in this disclosure within the scope of the invention.

The embodiments of the invention can collaborate with existing applications, systems, repositories, and subjects in general. The embodiments can also allow existing applications and processes to transparently use context aware data protection where they were only configured to use access context unaware rules and policies. Furthermore, during use, existing subjects can remain unaware of access contexts and access context changes that may modify resources and configurations or change security policies.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable device providing program code for use by or in connection with a computer or any instruction execution system. For the purposes of this description, a computer-usable or computer-readable device can be any hardware apparatus that can store the program for use by or in connection with the instruction execution system, apparatus, or device.

The device can be an electronic, magnetic, optical, electromagnetic, or semiconductor system (or apparatus or device). Examples of a computer-readable device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage device may store a computer-readable program code such that when the computer-readable program code is executed on a computer, the execution of this computer-readable program code causes the computer to transmit another computer-readable program code. The terms "computer usable storage device," "computer readable storage device," and "storage device" do not encompass a signal propagation medium, any description in this disclosure to the contrary notwithstanding.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

The description of the invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable storage device including computer usable code for context aware data protection, the computer usable code comprising:
   computer usable code for receiving information about an access context in a data processing system;
   computer usable code for identifying a resource affected by the access context, wherein a context unaware application serves the resource responsive to requests from recipients for the resource;
   computer usable code for retrieving the resource from the context unaware application;
   computer usable code for identifying a policy corresponding to the access context;
   computer usable code for determining a part of the resource to modify according to the policy;
   computer usable code for modifying the part according to the policy and the access context to form a modified resource, wherein the modifying the resource is performed even when no requests from any recipients are pending for the resource; and
   computer usable code for saving the modified resource such that the context unaware application serves the modified resource responsive to a second request for the resource.

2. The computer usable program product of claim 1, wherein receiving the information about the access context is asynchronous with a request for the resource.

3. The computer usable program product of claim 1, wherein the access context is an access context change that can occur.

4. The computer usable program product of claim 1, wherein the resource is a configuration of a repository.

5. The computer usable program product of claim 1, wherein the computer usable code for identifying the resource includes:
   computer usable code for deriving knowledge about resource, the deriving the knowledge further including making an inference that the access context affects a second resource thereby inferring that the resource has to be modified.

6. The computer usable program product of claim 1, wherein the access context comprises a plurality of individual access contexts and the modifying is responsive to an individual access context.

7. The computer usable program product of claim 1, wherein the computer usable code for modifying the resource comprises computer usable code for preparing information usable to modify the part according to the policy at an access context unaware system, and wherein the computer usable code for transmitting comprises computer usable code for providing the information usable to modify the resource to the access context unaware system wherein the access context unaware system applies the information to the resource in an access context unaware enforcement of the policy to form the modified resource at the access context unaware system.

8. The computer usable program product of claim 1, wherein the computer usable code is stored in a computer readable storage device in a data processing system, and wherein the computer usable code is transferred over a network from a remote data processing system.

9. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

10. The computer usable program product of claim 1, further comprising:
    computer usable code for detecting an access context change;
    computer usable code for modifying the modified resource responsive to the access context change, forming a second modified resource;
    computer usable code for receiving a third request for the resource after detecting the access context change; and
    computer usable code for serving, from the context unaware application, the second modified resource responsive to the third request.

11. A data processing system for context aware data protection, the data processing system comprising:
    a storage device including a storage medium, wherein the storage device stores computer usable program code; and
    a processor, wherein the processor executes the computer usable program code, and wherein the computer usable program code comprises:
    computer usable code for receiving information about an access context in a data processing system;
    computer usable code for identifying a resource affected by the access context, wherein a context unaware application serves the resource responsive to requests from recipients for the resource;
    computer usable code for retrieving the resource from the context unaware application;
    computer usable code for identifying a policy corresponding to the access context;
    computer usable code for determining a part of the resource to modify according to the policy;
    computer usable code for modifying the part according to the policy and the access context to form a modified resource, wherein the modifying the resource is performed even when no requests from any recipients are pending for the resource; and
    computer usable code for saving the modified resource such that the context unaware application serves the modified resource responsive to a second request for the resource.

12. The data processing system of claim 11, further comprising:
    computer usable code for detecting an access context change;
    computer usable code for modifying the modified resource responsive to the access context change, forming a second modified resource;
    computer usable code for receiving a third request for the resource after detecting the access context change; and computer usable code for serving, from the context unaware application, the second modified resource responsive to the third request.

13. A computer implemented method for context aware data protection, the computer implemented method comprising:
    providing a set of parameters representing a state model, the state model representing an access context in a data processing system;
    providing a set of policies in a policy repository, the set of policies being usable for managing access to a set of resources, resources in the set of resources being data, wherein a context unaware application serves the resources responsive to requests from recipients for the resources;
    detecting, using a processor and a memory, a change in the access context by detecting a change in a parameter in the set of parameters;
    identifying a resource affected by the access context change;
    identifying a policy corresponding to the access context change;
    identifying a context unaware access control enforcement component that manages access to the resource;
    modifying, using the processor and the memory, the context unaware access control enforcement component according to the policy, forming a modified context unaware access control enforcement component, wherein the modifying the context unaware access control enforcement component is performed even when no requests from any recipients are pending for the resource; and
    serving the resource from the context unaware application using the modified context unaware access control enforcement component responsive to a second request for the resource, thereby managing access to the resource with awareness of the access context change.

14. The computer implemented method of claim 13, wherein receiving the information about the access context change is asynchronous with a request for the resource.

15. The computer implemented method of claim 13, wherein the resource is a configuration of a data repository, the context unaware access control enforcement component being a component of the data repository.

16. The computer implemented method of claim 13, wherein the resource includes data of resource, attributes associated with the data, parameters associated with the data, and a configuration associated with the data.

17. The computer implemented method of claim 13, wherein identifying the resource includes:
    deriving knowledge about resource, deriving the knowledge further including making an inference that the access context affects a second resource thereby inferring that the context unaware access control enforcement component has to be modified.

18. The computer implemented method of claim 13, further comprising:
    detecting an access context change;
    modifying the modified context unaware access control enforcement component responsive to the access context change, forming a second modified context unaware access control enforcement component;
    receiving a third request for the resource after detecting the access context change; and
    serving, from the context unaware application, the second modified resource responsive to the third request and according to the second modified context unaware access control enforcement component.

19. A computer implemented method for context aware data protection, the computer implemented method comprising:
    receiving information about an access context in a data processing system;
    identifying a resource affected by the access context, the resource being data, wherein a context unaware application serves the resource responsive to requests from recipients for the resource;
    retrieving the resource from the context unaware application;
    identifying a policy corresponding to the access context;
    determining a part of the resource to modify according to the policy;
    modifying, using a processor and a memory, the part according to the policy and the access context to form a modified resource, wherein the modifying the resource is performed even when no requests from any recipients are-pending for the resource; and
    saving the modified resource such that the context unaware application serves the modified resource responsive to a second request for the resource.

20. The computer implemented method of claim 19, wherein receiving the information about the access context is asynchronous with a request for the resource.

21. The computer implemented method of claim 19, wherein the access context is an access context change that can occur.

22. The computer implemented method of claim 21, wherein the information about the access context is received on a system distinct from the data processing system providing the information.

23. The computer implemented method of claim 19, wherein the resource is a configuration of a repository.

24. The computer implemented method of claim 19, wherein the resource includes content of the resource, attributes associated with the resource, parameters associated with the resource, and a configuration associated with the resource.

25. The computer implemented method of claim 19, wherein identifying the resource includes:
    deriving knowledge about resource, deriving the knowledge further including making an inference that the access context affects a second resource thereby inferring that the resource has to be modified.

26. The computer implemented method of claim 19, wherein the access context comprises a plurality of individual access contexts and the modifying is responsive to an individual access context.

27. The computer implemented method of claim 19, wherein modifying the resource comprises preparing information usable to modify the part according to the policy at an access context unaware system, and wherein the transmitting comprises providing the information usable to modify the resource to the access context unaware system wherein the access context unaware system applies the information to the resource in an access context unaware enforcement of the policy to form the modified resource at the access context unaware system.

28. The computer implemented method of claim 19, wherein the access context is information associated with an environment in which a request for the resource is being made.

* * * * *